(12) United States Patent
Kasslin et al.

(10) Patent No.: US 8,379,586 B2
(45) Date of Patent: Feb. 19, 2013

(54) METHOD AND APPARATUS FOR RADIO COEXISTENCE

(75) Inventors: Mika Kasslin, Espoo (FI); Paivi M. Ruuska, Tampere (FI); Jari Junell, Espoo (FI); Juha Salokannel, Tampere (FI)

(73) Assignee: Nokia Corporation, Espoo (FI)

( * ) Notice: Subject to any disclaimer, the term of this patent is extended or adjusted under 35 U.S.C. 154(b) by 330 days.

(21) Appl. No.: 12/916,851

(22) Filed: Nov. 1, 2010

(65) Prior Publication Data

US 2012/0106461 A1   May 3, 2012

(51) Int. Cl.
*H04W 4/00* (2009.01)

(52) U.S. Cl. ......... 370/329; 455/450; 455/464; 455/509

(58) Field of Classification Search .................. 370/329; 455/450, 464, 509
See application file for complete search history.

(56) References Cited

U.S. PATENT DOCUMENTS

| | | | |
|---|---|---|---|
| 8,200,157 B2 * | 6/2012 | Kiukkonen et al. | 455/41.2 |
| 2010/0304685 A1 | 12/2010 | Wietfeldt et al. | |
| 2011/0305206 A1 * | 12/2011 | Junell et al. | 370/329 |
| 2012/0034913 A1 * | 2/2012 | Wang et al. | 455/426.1 |
| 2012/0058790 A1 * | 3/2012 | Junell et al. | 455/509 |

FOREIGN PATENT DOCUMENTS

| | | |
|---|---|---|
| WO | 2010117998 A1 | 10/2010 |
| WO | 2011085073 A1 | 7/2011 |

OTHER PUBLICATIONS

International Search Report (PCT/FI2011/050788) dated Dec. 23, 2011

Harada H. et al, Research, development, and standards related activities on dynamic spectrum access and cognitive radio, 2010 IEEE Symposium on New Frontiers in Dynamic Spectrum, Apr. 6-9, 2010 pp. 1-12, ISBN 978-1-4244-5189-0, doi: 10.1109/DYSPAN2010.5457832.

Junell J. et al. Coexistence for unlicensed spectrum users in white spaces, 2010 3rd International Symposium on Applied Sciences in Biomedical and Communication Technologies (SABEL), Nov. 7-10, 2010, pp. 1-5. ISBN 978-1-4244-8131-6, dpo: 10.1109/Isabel.2010.5702808.

Kwak J. et al., Coexistence system proposal, IEEE Mentor, IEEE Standards Association, IEEE 802.19 Wireless Coexistence WG, [online]. Oct. 31, 2010.

Sawai R. et al. 'Coexistence mechanism and its algorithm', IEEE Mentor, IEEE Standards Association, IEEE 802.19 Wireless Coexistence WG doc.

Baykas T. et al. 'Overview of TV white spaces: current regulations, standards and coexistence between secondary users', 2010 IEEE 21st International Symposium on Personal, Indoor and Mobile Radio Communications Workshops, Sep. 2010.

* cited by examiner

*Primary Examiner* — Chi Pham
*Assistant Examiner* — Raul Rivas
(74) *Attorney, Agent, or Firm* — Banner & Witcoff, Ltd.

(57) ABSTRACT

Described herein are methods and apparatus for a communications system of radio coexistence on Television White Spaces band in which a radio coexistence enabler associated with a Television Band Device in a Television Band Device Network mastered by a radio coexistence enabler of a master type, sending a request as a client to a radio coexistence manager to receive information of at least one locally available radio resources, available device-to-device connections and nearby access networks from the coexistence manager to establish a connection based on the devices availability and which received information is without control of the coexistence enabler of a master type.

19 Claims, 5 Drawing Sheets

METHOD AND APPARATUS FOR RADIO COEXISTENCE

FIELD OF THE INVENTION

The present application relates generally to radio coexistence.

BACKGROUND OF THE INVENTION

Vacant television frequencies, often referred to as TV white spaces, have been allowed for use on an unlicensed basis in many geographical areas. These TV white spaces are frequency channels allocated for television broadcasting that will not be used in given geographic areas. Many proposals exist for using the TV white space (TVWS) spectrum. For example, it has been suggested that wireless regional area networks (WRANs) could be established to provide high-speed internet access with a larger coverage. Also application of wireless local area networks (WLANs) on TV white spaces is planned.

Currently the basic rules of the Federal Communications Commission (FCC) for TVWS operations in the US on secondary basis specify that a network can be initiated by a Mode II personal/portable or a Fixed device that accesses a database to check available channels based on the geographical location of the device. Such devices may be referred generally as master devices. The master device can initiate a network in an available channel and it can provide the list of available channels for client devices. A client device is a device that cannot initiate a network but operates under control of a master device. The IEEE 802.19 task group 1 has started to define a coexistence management system to facilitate coexistence among different kind of networks and devices in TVWS.

SUMMARY OF THE INVENTION

Various aspects of examples of the invention are set out in the claims.

According to a first embodiment, there is provided a method, comprising: sending, by a first radio coexistence enabler associated with a first device operating in a network mastered by a second device comprising a second radio coexistence enabler of a master type, a request to a radio coexistence manager, the request indicating that the first radio coexistence enabler is of a client type, receiving information on at least one of locally available radio resources, candidate devices for device-to-device connections, and further one or more nearby access networks from the radio coexistence manager, and causing establishment of a connection by the first device to a third device on the basis of the received information without control of the second device.

According to a second embodiment, there is provided an apparatus comprising at least one processor and at least one memory including computer program code, the at least one memory and the computer program code configured to, with the at least one processor, cause the apparatus at least to perform: cause sending of a request of a first radio coexistence enabler to a radio coexistence manager, the first coexistence enabler being associated with a first device operating in a network mastered by a second device comprising a second radio coexistence enabler of a master type and the request indicating that the first radio coexistence enabler is of a client type, receive information on at least one of locally available radio resources, candidate devices for device-to-device connections, and further one or more nearby access networks from the radio coexistence manager, and provide information for causing establishment of a connection by the first device to a third device on the basis of the received information without control of the second device.

The invention and various embodiments of the invention provide several advantages, which will become apparent from the detailed description below.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION

References are made below to TVWS related example embodiments, but it is to be appreciated that the application of presently disclosed features are not limited to any specific frequencies or related techniques. For example, the terms "coexistence enabler" and "coexistence manager" are to be broadly understood to refer to any radio coexistence related entities having at least partly similar functionality as illustrated below for the coexistence enabler and the coexistence manager. The features illustrated below may be applied for various arrangements facilitating coexistence on white space channels. The term "white space channel" is to be understood broadly, and cover channels reserved for licensed use but made available, for example, locally or temporarily for unlicensed use because not used by primary users.

Figure 1:
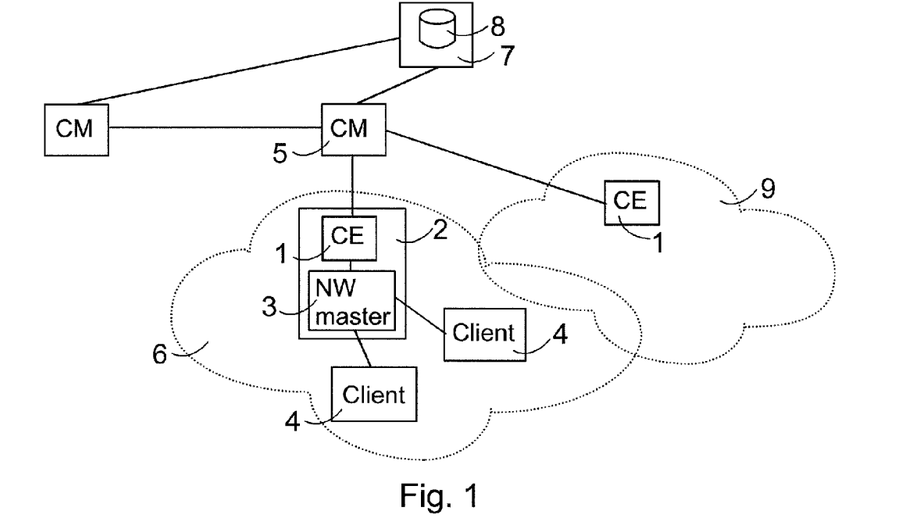
FIG. 1 illustrates a radio coexistence system.

FIG. 1 illustrates entities of one proposed radio coexistence system. A coexistence enabler (CE) 1 provides an interface for a radio device 2, such as a TV band device (TVBD), to the radio coexistence system and represents the radio device 2 and/or the radio network 6 in the coexistence system. The CE 1 may request and receive information required for coexistence from a radio entity 3. The collected information may comprise capabilities and resource needs of the TVBD network, and the characteristics of the radio environment, for example. The CE may reconfigure the radio device operation according to coexistence decisions received from a coexistence manager (CM) 5. The CE 1 may reside in a device 2 operating as the master device of the network 6, the master functionality being represented in FIG. 1 by the logical entity network (NW) master 3. However, in another embodiment, the NW master 3 and the CE 1 may be located in different devices. The network 6 may comprise one or more client devices 4, operating under control of the master device 2.

The CM 5 is configured to communicate with one or more database access devices 7 comprising or connected to one or more databases 8 storing radio coexistence related information, for example a TVWS database. The database access device 7 may be arranged to receive information at least on white space channels available at a given geographical area from the database 8.

The CM 5 is the main decision maker of the coexistence system. It discovers and solves the coexistence conflicts of radio networks 6, 9 operating in a geographical area. The CM 5 serves one or more networks 6. Depending on the deployment, the CM 5 may reside in a radio terminal device, such as a TVBD, or in a network entity. The CM 5 may discover interfering networks and their CMs, and share information with other CMs and other entities. Based on the collected information it may reconfigure the operation of its own network(s), but may also perform resource reallocation for the whole neighborhood as needed. However, there may be drawbacks involved when only a single master device 2 among devices of a network is enabled to have access to the coexistence system, e.g. when there is a fault in the operation of the master device.

Figure 2:
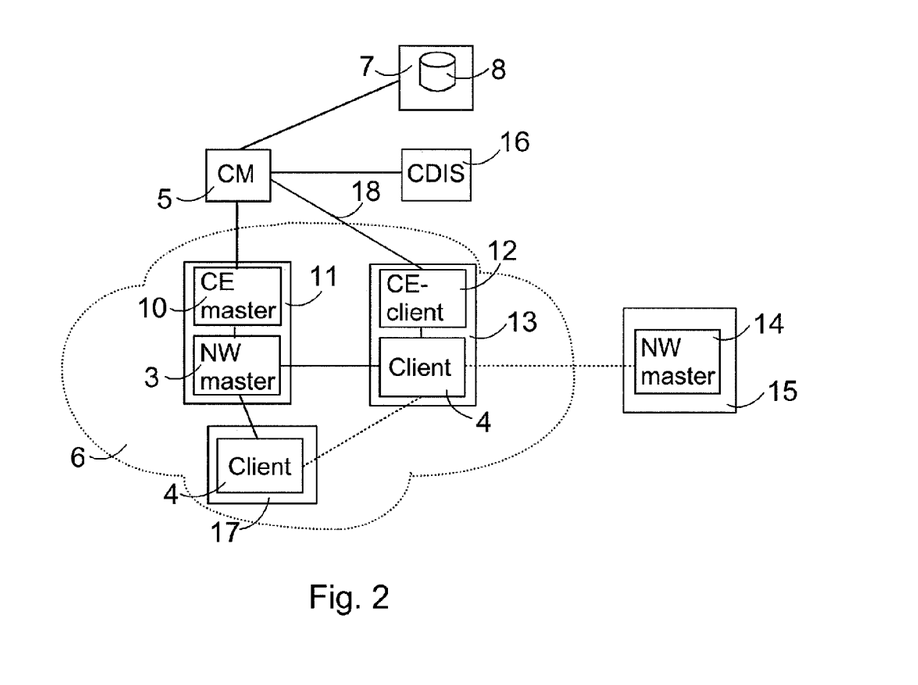
FIG. 2 illustrates a radio coexistence system with different coexistence enablers.

FIG. 2 illustrates radio coexistence related entities according to an example embodiment. There may be at least two types of coexistence enablers: a coexistence enabler of a master type 10 and a coexistence enabler of a client type 12. The coexistence enabler of a master type 10, hereafter denoted simply as "CE-master", may be arranged in a device 11 capable of initiating a radio network 6 or a cell and operating as a master or a control (or coordination) node of the radio network 6 or the cell. Such device, hereafter referred to as "master-device" 11, may control operational parameters of the network 6 or the cell. There can be only one master device per a network/cell. The master-device 11 may be an access point, base station, or mesh point, for example. The CE-master 10 may comprise the same or similar functionality as the CE 1 of the example system of FIG. 1.

The coexistence enabler of a client type 12, hereafter simply denoted as the "CE-client", refers to a type of a coexistence enabler, which is associated with and can be used in a device 13 or an entity of a device configured to operate as a client in a radio network. Such device 13 is hereafter referred to as "client-device". The client-device 13 operates in the network 6 or cell in the question under control of the master-device 11.

The client-device 13 may comprise an entity or a radio communications unit configured and activated to operate in the client role, as denoted by "client entity" 4 in FIG. 2. As indicated 18 in FIG. 2, the CE-client 12 is not a client to the CE-master 10, but may communicate with the CM 5 without the involvement of the master-device 11. It is to be noted that, at the time of communication with the CM 5, it may be that the client-device 13 in which the CE-client 12 resides is not yet associated with any device in which the CE-master 10 resides. The client-device 13 may be mobile terminal device, a mesh point, an access point, or a base station, for example. In one embodiment, the CE-client 12 is provided in a TVBD operating as a client in a TVBD network.

The new CE-client 12 enables also client devices 13 to access the coexistence system and a limited set of coexistence services and information. This enables also client devices 13 to benefit for accessing coexistence system and receiving coexistence related information from the coexistence system, e.g. when they have lost connection to their network master or are looking for other networks or devices to connect to.

The CE-client 12 is not allowed to represent the wireless network 6 in which the associated client-device 13 is operating under control of the master 3. In one embodiment, the coexistence system limits certain services only to CE-masters 10, and only some services and information are available for CE-clients 12. It is to be appreciated that in some instances the device 13 may also comprise functionality to operate as a master (3) and CE-master (10).

The coexistence system may comprise or be connected to further systems or entities. It will be appreciated that there may be a plurality of CMs 5, each representing at least one radio network 6, and performing coexistence negotiations. The coexistence system may comprise a coexistence discovery and information server (CDIS) 16 assisting the CMs 5 in neighbor network discovery, for example. The CMs 5 may provide some information of the networks they serve to the CDIS (e.g. TX power class, location). The CDIS 16 may keep a record of registered CMs 5 and location and TX power class or maximum TX power of the networks 6 they serve, and may provide a list of candidate neighbors for a CM 5 which initiates the neighbor discovery for its network. The candidate neighbors may be listed in the estimated interference order at the location of the network for which the candidate neighbor list is provided. The CDIS 16 may maintain information on devices, such as TVWS devices, associated to the CMs. The CDIS 16 may also store also some other information relevant for coexistence, e.g. statistics of the spectrum use. There may be also an operator management entity connected to the coexistence system, e.g. to the CM 5.

The coexistence system illustrated in FIG. 2 may comprise or be connected to one or more wireless networks 6 and/or some further network connected to the same or different CM 5 (not shown in FIG. 2). Some examples of such network include a cellular or non-cellular radio access network (RAN), an IEEE wireless local area network, an ad-hoc network, a mesh network, or some other type of network capable of operating or supporting access establishment on one or more radio bands with white spaces. As indicated above, in one embodiment the devices 11, 13, 17 operate in a network in TVWS, wherein the network consists of secondary users. In one further embodiment, the devices 11, 13, 17 apply Wi-Fi technology in TVWS. However, it will be appreciated that the presently disclosed coexistence system features may be applied to arrange coexistence for radios of other types as well, and e.g. IEEE 802.11, 802.16, and/or 802.22 based radios represent merely some examples of such radios.

Figure 3:
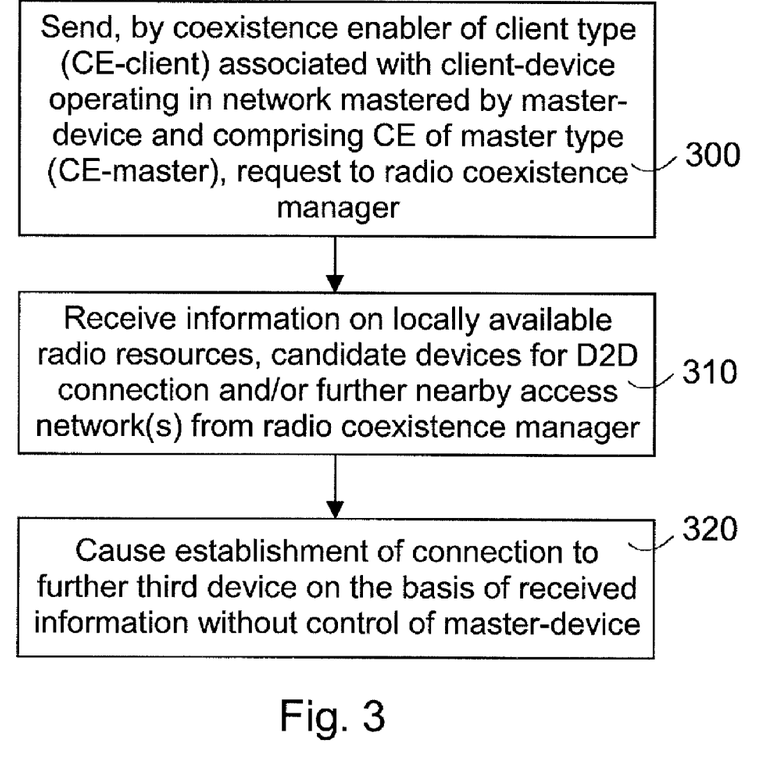
FIGS. 3 to 8 illustrate methods according to some embodiments.

FIG. 3 illustrates a method according to an embodiment. The method may be applied as a control algorithm in an apparatus configured to operate as the CE-client 12, for example.

The (first) radio coexistence enabler, in the subsequent example embodiments the CE-client 12 associated with the client-device 13 operating in the network 6 mastered by the master-device 11 (second device) comprising the (second) radio coexistence enabler 10 of a master type, generates and sends 300 a request to the radio coexistence manager 5. The request indicates that sending coexistence enabler 12 is of a client type. There are many instances in which such request may be generated and transmitted, some of which are illustrated later.

The CE-client 12 may cause the transmission of such request by providing the request to the client entity 4, which may transmit the request to the CM 5 by applying the resources available for the already established radio network 6. In another example embodiment, another network/bearer (and communications entity in the client-device 13) may be utilized for transmitting the request.

The CE-client 12 receives 310 information on locally available radio resources, candidate devices for device-to-device (D2D) connections, and/or information on further nearby access network(s) from the CM 5. In one embodiment the further nearby network is a wireless access network, e.g. IEEE 802.11, 802.16, or 802.22 based radio network.

On the basis of the received information, establishment of a connection, without control of the currently associated master-device 11, is caused 320 from the client-device 13 to a third device, such as the device 15 or 17. This may be caused by the CE-client 12. In one embodiment, the CE-client 12 provides information, which may include some or all of the received coexistence-related information as such or in modified form, for causing the connection establishment of the connection to the client 4 or another entity in the client-device 13. The establishment of the connection without control of the master-device 11 may refer generally to the capability of the client-device 13 to at least initiate connection establishment without involvement of the master-device 11. Such connection establishment may be carried out independently of the master-device 11, which may refer to the client-device 13 establishing the connection without connecting the master-device 11, for example. It is to be appreciated that there may be some restrictions caused by the master-device 11 in the operation of the client-device 13, which may have some influence also in block 320. For example, if the client 4 is associated to the NW master 3, then the client 4 may need to listen the NW master 3 at certain intervals, and during that interval the client 4 may not establish e.g. a device-to-device connection. In some embodiments the association to the master may yield to these kinds of time restrictions even though the connection establishment is not otherwise "mastered" by the master-device 11. Hence, the definition "without control of" does not exclude such restrictions. Thus, the client-device 13 may benefit from the information available in the coexistence system and initiate communications independently of the NW master 3 and the CE-master 10.

Figure 4:
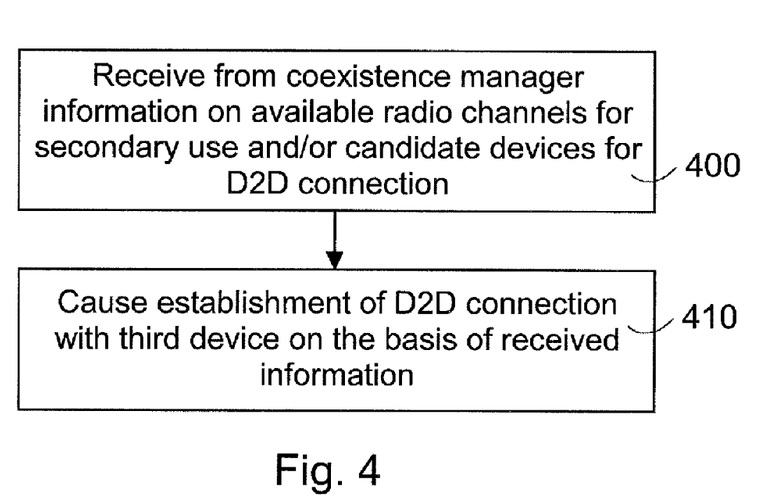

FIG. 4 illustrates a method, which may be applied in blocks 310 and 320, for example. The CE-client 12 receives 400 from the CM 5 information on available radio channels for secondary use and/or information on candidate device(s) for D2D connections. On the basis of this information, a D2D connection is established to the third device 15, 17, operating in the same network 6 or another network. The client-device may thus find an available radio channel and connect the other device on the available radio channel, or connects a device indicated in the received information. For example, on the basis of the received information, the client-device 13 may then connect to the device 17 operating as a client in the network 6 managed by the master-device 11, by applying a currently available TVWS channel, without any involvement of the master-device 11. For example, such D2D communications links are available in IEEE 802.11 systems without any support from a WLAN access point and without requiring the client-device 13 to initiate a WLAN network.

Figure 5:
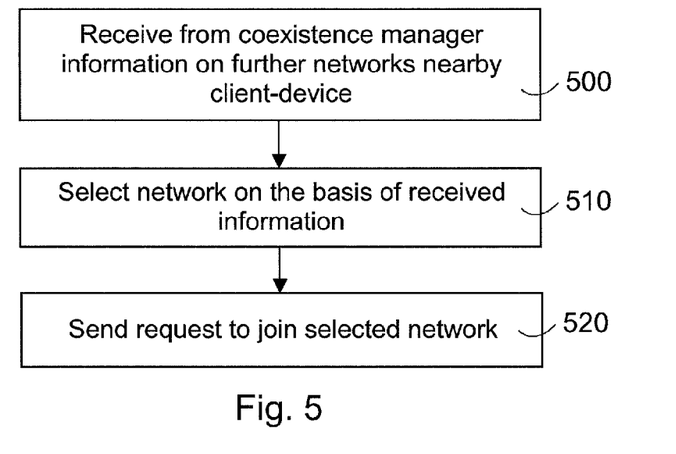

FIG. 5 illustrates another method, which may be applied in blocks 310 and 320, for example. The CE-client 12 may receive 500 from the CM 5 information on further network(s) available at the geographical location of the client-device 13. Another network may be selected 510 on the basis of the received information. For example, the CE-client 12 may provide the received information for the client entity 4 or another unit controlling network selection in the device 13. After the new network is selected, a request to join the selected network may be sent 520. The selection of the network may thus lead also to selection of a new master (14) for the client-device 13.

Further, in one embodiment, instead of directly selecting a network, in block 510 a new (access) device 15 or a master 14, is selected on the basis of the received information, and thus also the network may be implicitly selected. Thus, the client-device 13 may send the request 520 to join the other network mastered by the third device.

Figure 6:
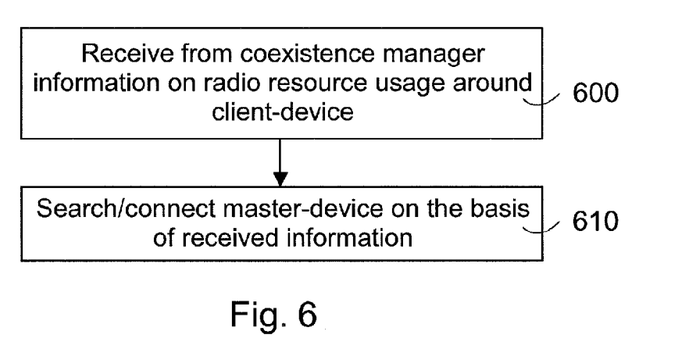

FIG. 6 illustrates a still further method, which may be applied in blocks 310 and 320, for example. Information on radio resource usage around the client-device 13 is received 600. The client-device 13 may then search for and/or connect 610 the master-device 11 on the basis of the received radio resource usage information. Thus, instead of connecting a further "third" device as illustrated in block 320 of FIG. 3, the client-device 13 may use the information received by the CE-client 12 from the CM 5 to connect the master-device 10.

For example, if the CM 5 has instructed change of operation channel for the network 6 managed by the master-device 11, the client-device 13 may detect the new channel on the basis of the information from the CM 5.

The block 600 or 610 may be entered after detecting the connection to the master-device 11 being disconnected, for example. The client-device 13 may store the information received (310, 400, 500, 600) from the CM 5 and retrieve the stored information later, upon a trigger such as the lost connection to the master-device 11. In case of the connection being lost, another bearer network, such as a cellular network, may be used to connect the CM 5. Thus, the client-device 13 may utilize the coexistence system to reinstate the lost connection and association to the NW master 3. Thus, the client 4 of the client-device 13 may reconnect to the network 6 at a channel on which network is supposed to be.

However, it is to be appreciated that the information on radio resource usage from the CM 5 may be used also for other purposes, such as for searching for some other device 15, 17 or network.

Figure 7:
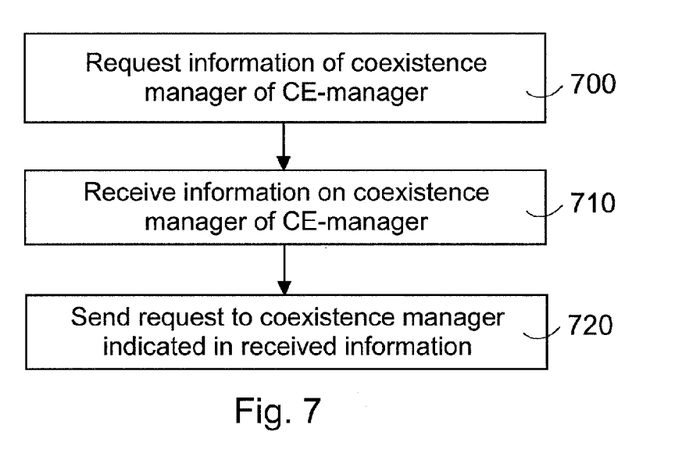

FIG. 7 illustrates a still further method, which may be applied by the CE-client 12 in connection with one or more of the methods illustrated in FIGS. 3 to 6, for example. Information on coexistence manager associated with the CE-manager 10 is requested 700. For example, the CE-client 12 may cause the client entity 4 to send such inquiry over a radio interface to the NW master 3, providing the request to the CE-master 10. Thus, at least in some embodiments, there may be a signalling interface between the CE-client 12 and the CE-master 10.

Information on the CM 5 currently associated with the master-device 11 (of the client-device 13) is received 710. The information may be originated by the CE-master 10 and transmitted to the client-device 13 by the NW-master 3, for example. The CE-client 12 may then send 720 a request, such as the request 300 illustrated in FIG. 3, to the CM 5 indicated in the received information. The embodiment of FIG. 7 enables the CE-client 12 to obtain information on the appropriate CM 5 managing the coexistence of the network 6 the client-device 13 is operating in, and access the same CM as the master-device. This is important since the CE-master 10 and the CE-client 12, operating in the same radio network 6, should be registered in the same CM 6 to avoid errors.

Some further embodiments will be illustrated below. It is to be appreciated that some or all of the features further described below may be applied in connection with at least some of the above illustrated methods.

In some embodiments, the CE-client 12 registers to the CM 5. The request 300 may be a registration request for registering the CE-client 12 to the CM 5.

When a CE 10, 12 registers to the CM 5, it will indicate the CE-type. In the present example embodiments the registration request thus indicates that the sender of the request is of a master-type (CE-master 10) or a client type (CE-Client 12). The CE may also provide the identifier of the radio device 11, 13 it is associated to, e.g. an identifier of a white space band device (WSBD).

The (registration) request 300 additionally indicates at least one of an identifier of the network or cell in which the client-device 13 operates as client and an identifier of the master-device 11 of the network 6 or cell in which the client-device 13 operates as client. Thus, the CM 5 can determine appropriate information to deliver to the CE-client 12. In a message from the CE-master 10, an identifier of the radio network or cell operated by the associated master-device 11 may be provided. It is to be noted that an identifier for a group of cells, which may be considered as a kind of network identifier, may be applied.

The (registration) request may also comprise an identifier of the requesting CE (which may be a unique identifier of the CE 10, 12 or the associated device 11, 13). The messages between the CM 5 and the CE-client 13 may also comprise respective CM address and CE address.

The registration request may in one embodiment be the request 300, in response to which the CM 5 returns 310, 400, 500, 600 coexistence information to the CE-client 12. However, there may be a specific request from the CE-client 12 to the CM 5 for requesting some or more of the information received in block 310, 400, 500, 600. Such specific request may indicate the current location of the CE 10, 12 and/or the network 6 to which the CE 10, 12 is associated. In one embodiment, CE 10, 12 registers or subscribes to the coexistence service, and may be provided with initial information upon the registration. The CE 10, 12 may then after registration send the request upon a trigger in the client-device 13, such as detection of a lost connection. In a further example, the need for D2D connection may arise some time after the registration and thus information on available channels for D2D usage should be updated (even if received during registration process). In one embodiment, the CE 10, 12 may be provided with coexistence information updates once the information is updated (without separately requesting the information). The CM 5 may send such information for registered CEs 10, 12 when radio environment changes or a new network appears at the location of the CE 10, 12 (which may be updated to the CM 5) or the network to which the CE is associated, for example. There may be a precondition of the CE 10, 12 having to be subscribed to a service doing this, and/or even requested such automatic push.

Figure 8:
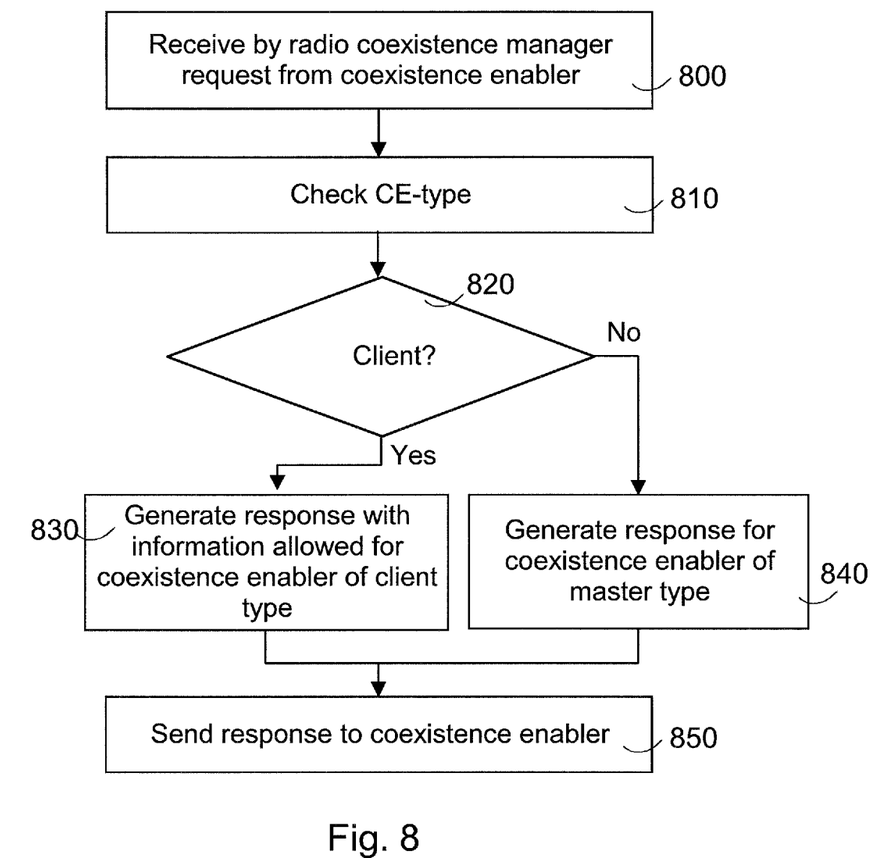

FIG. 8 illustrates a method according to an embodiment, which may be applied by an apparatus arranged to operate as a coexistence manager, such as the CM 5 of FIG. 2. A request, such as a registration request or other type of request from the CE 10, 12 illustrated above, is received 800 from a radio coexistence enabler 10, 12.

The coexistence type of the CE 10, 12 sending the request is checked 810, 820, e.g. by checking a specific field indicating a value specified for client type or a value specified for master type. If the request indicates that the radio coexistence enabler is of a client type, coexistence related information allowed for the radio coexistence enabler of a client type may be selected and response comprising such selected information may be generated 830. For example, the apparatus may be preconfigured to retrieve a specific limited set of information items, including information of one or more of the information types indicated above in connection with blocks 310, 400, 500, 600, for the CE of client type. If the requesting CE is of master-type, an appropriate response for master-type CE is generated 840. The response is then sent 850 to the CE 10, 12.

For example, a CM 5 that receives 800 a registration request from a CE 10, 12 may decide, on the basis of the CE-type indicated in the request, which services are available for the CE, if the registration succeeds. For example, there may be at least two types of coexistence system services: coexistence management services and coexistence information services. All the coexistence management and information services are available for CE-masters 10. The coexistence management services are available only for the CE-masters 10 as they deal with network level resource management issues that are relevant for master-devices 11 only.

At least some of the coexistence information services are available for CE-clients 12. Some examples of available coexistence information items were illustrated above in connection with FIGS. 3 to 7.

In one embodiment, the CE-client 12 receives a location-dependent spectrum map indicating at least channel states from the CM 5, for example in connection with block 310, 400, 600. A channel state may indicate whether the channel is available or occupied, and may indicate also more details on channels which are occupied, such as interference level, utilization, network type/ID of the interference source. The spectrum map may be used for various purposes by the CE-client 12 and the client-device 13. In one embodiment, a channel is selected for the connection 320, 410, 610 on the basis of the information in the spectrum map.

The CM 5 may provide 830, 850 the spectrum map it has formed for the CE-master 10 representing the radio cell/network in which the client-device 13 operates. In one embodiment, the CE-client 12 indicates the geo-location of the associated client-device 13 in the request (300) to the CM 5. The CM 5 may thus provide more accurate information of the radio resource usage and availability in the location of the client-device 13. In one embodiment, the CM 5 may be arranged to indicate frequency channels that are more useful than some others in the location of the client-device 13.

A registered CE 10, 12 may be arranged to generate and send to the CM 5 an information update message to establish or update coexistence enabler status information. The CM 5 may on the basis of the received information update message update CE status, which may involve updating a radio coexistence database, such a database 8 or a database maintained by the CDIS 16, or informing other entities, such as other CEs and CMs. The CE 10, 12 may submit the information update message at any time when being registered to a CM 5, thus enabling to have the CM 5 up-to-date regarding CE-information that is less static in nature than the information submitted as part of the registration request message (or another message containing less-static CE-information). The information update message may comprise one or more of an identifier of the coexistence enabler 10, 12, an identifier of the device 11, 13 associated with the coexistence enabler 10, 12, a registration identifier received from the coexistence manager 5 in acknowledgement of a successful registration, transmit power of the device 11, 13, and geographical location of the device 11, 13. The CM 5 may respond to the information update by providing coexistence information related to the current location/network of the CE 10, 12.

In one embodiment, the CE-client 12 is arranged to send information to the CM 5 about its further operations (independent of the master-device 11), such as the connections 320, 410, 520. For example, the CE-client 12 may be arranged to inform the CM 5 about established D2D connection(s) and their used frequencies/channels. The CM may then take also this information into account, e.g. when forming a spectrum map and/or if another nearby CE 10, 12 requests available resources. Such information on the further operations of the CE-client 12 without control of the master-device 11 may be included in the information update message, or some other message from the CE-client 12 to the CM 5.

The above-illustrated CE-model, supporting at least some of the above-illustrated features, may be specified to be extensible to support interfacing to other Cognitive Radio (CR) services. The CE-client 12 may be implemented as a single enabler/interface module that can be used in any type of devices to access coexistence system services. A TVWS device/interface is just one example of available radio devices/interfaces which the CE-client 12 may be arranged to serve.

It is to be appreciated that the above methods and embodiments illustrate only some examples of applying the present features related to arranging new types of coexistence enablers, and various modifications, combinations and/or additions may be made to these embodiments. For example, there can be different (and further) CE-types, not limited to the master and client types illustrated above, which may receive different kinds of services from the CM 5, depending on their CE-type.

In one example variation, the device 13 associated with a CE capable of operating at least as a CE-client 12 is not operating as a client in (any white space) radio network mastered by a master-device 11. For example, such client type of device 13 is un-associated to a white space master/network which has a master 3. Such device may be newly activated at a new geographical area and may be searching for new white space devices or networks, for example. Thus, the CE-client 12 may connect to any available CM 5, by using a white-space or non-white space network, such as a cellular network or a conventional WLAN network. In one embodiment, the CE-client 12 may be preconfigured with information of a default CM 5. The CE-client 12 may request information from the CM by applying at least some of the above illustrated features. The CE-client 12 should inform the CM 5 also its geographical location. The CM 5 provides (830, 850) for the CE-client 12 coexistence related information, such as information illustrated above in connection with blocks 310, 400, 500, 600. This embodiment enables the device comprising the CE-client 12 to utilize the coexistence system and information from the CM 5, similarly as illustrated above for the client-device 13 for network discovery, for detecting available white space channels e.g. for establishing D2D connections, etc.

In one embodiment, the client-device 13 may be configured to use two or more different radios in the white space band. For example, a device in a residential area may be arranged to operate as a terminal (and in client-role) in an IEEE 802.22 network providing Internet access to the house and as an AP (and in master role) in IEEE 802.11 network providing connectivity to wireless 802.11 terminals in the house. In this case, the device may operate both CE-master 10 and CE-client 12 functions and may be considered as two separate devices from coexistence point of view.

In another example, a terminal may be able to access (as clients) e.g. two WLANs. Thus, the CE-client 12 in the terminal should be able to access the CMs 5 of both networks if coexistence services/information is needed for both networks. Further, such CE-client 12 could connect to the CM 5 of the master-device 11 only if it wants coexistence information related to that network, but may connect to another CM if wants some other information/service not related to the network mastered by the master-device 11.

Figure 9:
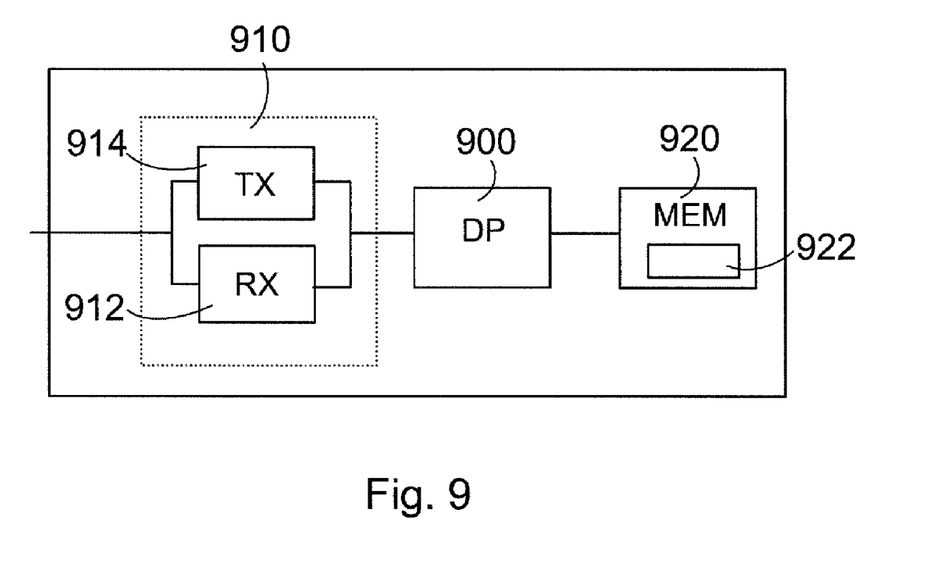
FIG. 9 illustrates an apparatus according to an embodiment.

FIG. 9 is a simplified block diagram of high-level elements of an apparatus according to an embodiment. The apparatus comprises a data processing element DP 900 with at least one data processor and a memory 920 storing a program 922. The apparatus may be configured to provide the CE 10, 12 and/or further features of the radio device 11, 13 associated with the CE. In another embodiment, the apparatus may be configured to provide the CM 5. For example, the apparatus may be configured to carry out at least some of the functions illustrated above for the CE-client 12 or the CM 5.

The memory 920 may comprise non-volatile portion, such as EEPROM, flash memory or the like, and a volatile portion, such as a random access memory (RAM) including a cache area for temporary storage of data, and implemented using any suitable data storage technology suitable for the technical implementation context of the respective entity. The memory 920, or another memory, may store coexistence related information and/or parameters for the CE-type in question, which may be used for causing at least some operations in the apparatus as illustrated in connection with FIGS. 3 to 8 above. The data processing element 900 may be of any type suitable to the local technical environment, and may include one or more of general purpose computers, special purpose computers (such as an application-specific integrated circuit (ASIC) or a field programmable gate array FPGA), microprocessors, digital signal processors (DSPs) and processors based on a multi-core processor architecture, as non-limiting examples.

The apparatus may comprise at least one radio frequency transceiver 910 with a transmitter 914 and a receiver 912. The apparatus of FIG. 9 may be arranged to use licensed and/or unlicensed bands. For example, the apparatus may operate in accordance with wireline protocols, such as Ethernet and digital subscriber line (DSL), with second-generation (2G) wireless communication protocols, such as GSM, with third-generation (3G) wireless communication protocols, such as 3G protocols by the 3GPP, CDMA2000, WCDMA and time division-synchronous CDMA (TD-SCDMA), with fourth-generation (4G) wireless communication protocols, such as 3GPP LTE, wireless local area networking protocols, such as one or more versions of the IEEE 802.11 specifications, short-range wireless protocols, such as Bluetooth, and/or the like. In some cases the apparatus may be provided with software defined radio having only one transmitter and receiver and digital processing of different radio protocols. A single chip may be configured to provide two or more radio technologies.

Embodiments of the present invention may thus be implemented in software, hardware, application logic or a combination of software, hardware and application logic. In an example embodiment, the application logic, software or an instruction set is maintained on any one of various conventional computer-readable media.

In the context of this document, a "computer-readable medium" may be any media or means that can contain, store, communicate, propagate or transport the instructions for use by or in connection with an instruction execution system, apparatus, or device, such as a computer, with some examples of a computer being described and depicted in connection with FIG. 9. A computer-readable medium may comprise a tangible and non-transitory computer-readable storage medium that may be any media or means that can contain or store the instructions for use by or in connection with an instruction execution system, apparatus, or device, such as a computer.

The program 922 may comprise computer program instructions that, when executed by a data processor 900, enable the apparatus to operate in accordance with at least some of embodiments of the present invention. The program may comprise computer program code configured to, with the at least one processor, cause the apparatus to perform at least some of the features illustrated in connection with FIGS. 3 to 8.

The apparatus could be in a form of a chip unit or some other kind of hardware module for controlling a radio device. The hardware module may form part of the device and could be removable. Some examples of such hardware module include a sub-assembly or an accessory device. It will be appreciated that the apparatus may comprise various further elements, such as further processor(s), further communication unit(s), user interface components, a GPS or another positioning system device, a battery, and a user identity module, not discussed in detail herein.

Although the apparatus and the data processing element 900 are depicted as a single entity, different features may be implemented in one or more physical or logical entities. There may be further specific functional module(s), for instance for carrying one or more of the features described in connection with FIG. 3.

In one example embodiment, there may be provided circuitry or user interface circuitry configured to provide at least some control functions illustrated above. As used in this application, the term 'circuitry' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present. This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware.

If desired, at least some of the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The invention claimed is:

1. A method, comprising:
sending, by a first radio coexistence enabler associated with, a first device operating in a network mastered by a second device comprising a second radio coexistence enabler of a master type, a request to a radio coexistence manager, the request indicating that the first radio coexistence enabler is of a client type,
receiving information on at least one of locally available radio resources, candidate devices for device-to-device connections, and further one or more nearby access networks from the radio coexistence manager, and
causing establishment of a connection by the first device to a third device on the basis of the received information without control of the second device.

2. The method of claim 1, wherein the connection is a direct device to device connection to the third device, which is operating as a client in the network mastered by a second device or another network.

3. The method of claim 1, wherein the first device selects another network on the basis of the received information, the third device being the master of the other network, and
the first device sends a request to join the other network mastered by the third device.

4. The method of claim 1, wherein the first coexistence enabler receives from the coexistence manager information on radio resource usage around the first device, and
after a connection to the second device is disconnected, the first device searches for the second device on the basis of the information on the radio resource usage from the coexistence manager.

5. The method of claim 1, wherein the request additionally indicates at least one of an identifier of the network or cell in which the first device operates as a client and an identifier of the master of the network or cell in which the first device operates as client.

6. The method of claim 1, wherein the request is a registration request for registering the first coexistence enabler of the client type to the radio coexistence manager.

7. The method of claim 1, wherein the first coexistence enabler generates and sends an information update message to the radio coexistence manager to establish or update coexistence enabler status information.

8. The method of claim 1, wherein the first device associated with the first radio coexistence enabler is arranged to operate as a client in a network in television white space spectrum, wherein the network consists of secondary users.

9. A method, comprising:
receiving, by a coexistence manager, a request from a radio coexistence enabler,
detecting on the basis of the request that the radio coexistence enabler is of a client type,
selecting information allowed for the radio coexistence enabler of a client type, and
sending for the coexistence enabler the selected information, comprising information on at least one of locally available radio resources, candidate devices for device-to-device connections, and one or more further nearby access networks.

10. An apparatus, comprising:
at least one processor; and
at least one memory including computer program code,
the at least one memory and the computer program code configured to, with the at least one processor, cause the apparatus at least to perform:
cause sending of a request of a first radio coexistence enabler to a radio coexistence manager, the first coexistence enabler being associated with a first device operating in a network mastered by a second device comprising a second radio coexistence enabler of a master type and the request indicating that the first radio coexistence enabler is of a client type,
receive information on at least one of locally available radio resources, candidate devices for device-to-device connections, and further one or more nearby access networks from the radio coexistence manager, and
provide information for causing establishment of a connection by the first device to a third device on the basis of the received information without control of the second device.

11. The apparatus of claim 10, wherein the connection is a direct device to device connection to the third device, which is operating as a client in the network mastered by a second device or another network.

12. The apparatus of claim 10, wherein the first device is configured to select another network on the basis of the received information, the third device being the master of the other network, and
the first device is configured to send a request to join the other network mastered by the third device.

13. The apparatus of claim 10, wherein the apparatus is configured to receive from the coexistence manager information on radio resource usage around the first device, and
the first device is configured to, after a connection to the second device is disconnected, search for the second device on the basis of the information on the radio resource usage from the coexistence manager.

14. The apparatus of claim 10, wherein the request additionally indicates at least one of an identifier of the network or cell in which the first device operates as a client and an identifier of the master of the network or cell in which the first device operates as client.

15. The apparatus of claim 10, wherein the apparatus is configured to send an information update message of the first coexistence enabler to the radio coexistence manager to establish or update coexistence enabler status information.

16. The apparatus of claim 10, wherein the apparatus is configured to receive information on coexistence manager associated with the second coexistence enabler from the second radio coexistence enabler, and
the apparatus is configured to send the request to the coexistence manager indicated in the received information.

17. The apparatus of claim 10, wherein the first device is arranged to operate as a client in a network in television white space spectrum, wherein the network consists of secondary users.

18. The apparatus of claim 10, wherein the apparatus is a wireless communications terminal device and comprises the first device and the first coexistence enabler.

19. An apparatus, comprising:
at least one processor; and
at least one memory including computer program code,
the at least one memory and the computer program code configured to, with the at least one processor, cause the apparatus at least to perform:
receive a request from a radio coexistence enabler to a coexistence manager,
detect on the basis of the request that the radio coexistence enabler is of a client type,
select information allowed for the radio coexistence enabler of a client type, and
send a response of a coexistence manager with the selected information, comprising information on at least one of locally available radio resources, candidate devices for device-to-device connections, and further one or more nearby access networks for the coexistence enabler.

* * * * *

UNITED STATES PATENT AND TRADEMARK OFFICE
CERTIFICATE OF CORRECTION

PATENT NO. : 8,379,586 B2  
APPLICATION NO. : 12/916851  
DATED : February 19, 2013  
INVENTOR(S) : Mika Kasslin et al.

Page 1 of 1

It is certified that error appears in the above-identified patent and that said Letters Patent is hereby corrected as shown below:

In the Claims  
In Column 11, Line 53:  
    Please delete "with, a first" and insert --with a first--.

Signed and Sealed this  
Fourth Day of June, 2013

Teresa Stanek Rea  
*Acting Director of the United States Patent and Trademark Office*